(12) United States Patent
Amirishetty et al.

(10) Patent No.: US 12,346,319 B2
(45) Date of Patent: Jul. 1, 2025

(54) TECHNIQUE FOR PARALLEL RECOVERY ON READ REPLICA

(71) Applicant: Google LLC, Mountain View, CA (US)

(72) Inventors: Anjan Kumar Amirishetty, Fremont, CA (US); Simhachala Sasikanth Gottapu, Dublin, CA (US); Niranjan Nilakantan, Cupertino, CA (US); Anthony Hsu, Sunnyvale, CA (US); Junjie Liang, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/390,005

(22) Filed: Dec. 20, 2023

(65) Prior Publication Data

US 2024/0289329 A1 Aug. 29, 2024

Related U.S. Application Data

(60) Provisional application No. 63/486,684, filed on Feb. 24, 2023.

(51) Int. Cl.
*G06F 16/2453* (2019.01)
*G06F 16/23* (2019.01)
*G06F 16/27* (2019.01)

(52) U.S. Cl.
CPC .... *G06F 16/24532* (2019.01); *G06F 16/2343* (2019.01); *G06F 16/27* (2019.01)

(58) Field of Classification Search
CPC . G06F 16/24532; G06F 16/2343; G06F 16/27
USPC ................................ 707/615, 643, 703, 704
See application file for complete search history.

(56) References Cited

U.S. PATENT DOCUMENTS

| | | | | |
|---|---|---|---|---|
| 5,870,758 | A | * | 2/1999 | Bamford ............. G06F 16/2343 707/E17.007 |
| 2007/0299855 | A1 | * | 12/2007 | Levin .................... G06F 16/313 707/E17.009 |
| 2010/0114817 | A1 | * | 5/2010 | Broeder ................ G06F 16/289 707/612 |
| 2011/0029498 | A1 | * | 2/2011 | Ferguson ............ G06F 16/2343 707/703 |
| 2013/0117307 | A1 | | 5/2013 | Vishnoi et al. |
| 2013/0160121 | A1 | * | 6/2013 | Yazdani .................. G06F 21/54 726/23 |
| 2015/0032680 | A1 | * | 1/2015 | Cichosz ................... G06N 5/04 706/50 |
| 2016/0110408 | A1 | | 4/2016 | Madhavarapu et al. |

(Continued)

OTHER PUBLICATIONS

Amazon Web Services Inc. Working with read replicas. Feb. 1, 2023. 32 pages. Retrieved from the Internet: <https://docs.aws.amazon.com/AmazonRDS/latest/UserGuide/USER_ReadRepl.html#USER_ReadRepl.Monitoring>.

(Continued)

*Primary Examiner* — Phong H Nguyen
(74) *Attorney, Agent, or Firm* — Lerner David LLP (57) ABSTRACT

Aspects of the disclosure are directed to a parallel recovery mode that applies log records while allowing read queries on read-replica databases. The parallel recovery mode can include applying log records in log sequence number (LSN) order for a block or for multiple blocks, and managing log records affecting multiple blocks. The parallel recovery mode can further manage dependency between different log records and maintain transactional consistency on read queries.

20 Claims, 6 Drawing Sheets

(56) References Cited

U.S. PATENT DOCUMENTS

| | | | |
|---|---|---|---|
| 2017/0024315 A1 | 1/2017 | Leshinsky et al. | |
| 2017/0116252 A1* | 4/2017 | Krishnaswamy | ....... G06F 16/27 |
| 2019/0317865 A1 | 10/2019 | Heidel et al. | |
| 2019/0361914 A1 | 11/2019 | Weaver et al. | |
| 2020/0012659 A1* | 1/2020 | Dageville | ............. G06F 16/245 |
| 2020/0042609 A1* | 2/2020 | Huang | .............. G06F 16/24554 |
| 2020/0257672 A1 | 8/2020 | Lee et al. | |

OTHER PUBLICATIONS

The PostgreSQL Global Development Group. Chapter 27. High Availability, Load Balancing, and Replication. 19 pages. Retrieved on Feb. 14, 2023. Retrieved from the Internet: <https://www.postgresql.org/docs/current/high-availability.html>.

International Search Report and Written Opinion for International Application No. PCT/US2024/012946 dated May 29, 2024. 15 pages.

Nakamura et al. Integrating TicToc with Parallel Logging. 2018 Sixth International Symposium on Computing and Networking Workshops (CANDARW), IEEE, Nov. 27, 2018 (Nov. 27, 2018), pp. 105-111, DOI: 10.1109/CANDARW.2018.00028.

Nakamura et al. Integration of TicToc Concurrency Control Protocol with Parallel Write Ahead Logging Protocol. International Journal of Networking and Computing, [Online] vol. 9, No. 2, Jul. 2019 (Jul. 2019), pp. 339-353, ISSN: 2185-2839, DOI: 10.15803/ijnc.9.2_339. Retrieved from the Internet: <https: //www.jstage.jst.go.jp/article/ijnc/9/2/9_339/_pdf>.

\* cited by examiner

TECHNIQUE FOR PARALLEL RECOVERY ON READ REPLICA

CROSS-REFERENCE TO RELATED APPLICATIONS

The present application claims the benefit of the filing date of U.S. Provisional Patent Application No. 63/486,684, filed Feb. 24, 2023, the disclosure of which is hereby incorporated herein by reference.

BACKGROUND

A database management system (DBMS) is a system for managing one or more databases as well as for receiving and resolving queries to the managed databases. A DBMS can manage one or more tables or relations of data stored on one or more storage devices and forming part of one or more managed databases. The DBMS can read and write to individual rows or columns of the managed tables, including updating, deleting, and adding records.

The DBMS can operate read-replica databases in a serial recovery mode, continuously applying write ahead log (WAL) records received from a primary database. While the read-replica database is catching up to the primary database, users can continue running read queries.

Typically, read-replica databases perform log record processing serially in log sequence number (LSN) order. However, if a primary database generates a significant number of WAL records, e.g., one million log records per second, with multiple processes in parallel, the serial log record processing cannot keep up. The read-replica database would then lag behind the primary database, unable to serve the latest data.

BRIEF SUMMARY

Aspects of the disclosure are directed to a parallel recovery mode, allowing for read queries with consistency on read-replica databases. The parallel recovery mode can apply log records in batches while still serving read queries on read-replica databases. The parallel recovery mode can manage log records in log sequence number (LSN) order for a data block or for multiple data blocks. The parallel recovery mode can further manage dependency between different log records and maintain transactional consistency on read queries. The parallel recovery mode can also handle log records pertaining to data definition language (DDL).

An aspect of the disclosure provides for a method for performing parallel write ahead log (WAL) record processing, the method including: receiving, by one or more processors, a batch of log records, each log record having a log sequence number (LSN); assigning, by the one or more processors, the log records of the batch to one or more parallel processes based on one or more block references, wherein each log record of the batch is processed in LSN order by the parallel process to which each log record of the batch is assigned; determining, by the one or more processors, that a read transaction is reading a block of data being modified in the batch of log records; and instructing, by the one or more processors, the read transaction to wait for the log records of the batch to be applied on the block of data being modified in response to the block not being the first block being modified in the batch.

In an example, each LSN corresponds to an order a log record was received. In another example, the one or more block references includes at least one of database number, tablespace number, table number, fork number, or block number. In yet another example, assigning the log records of the batch to a parallel process further includes using a hash function that includes the one or more block references.

In yet another example, the method further includes: determining, by the one or more processors, a log record of the batch affects multiple blocks of data; locking, by the one or more processors, the multiple blocks of data before the batch is applied; and generating, by one or more processors, a fake local buffer. In yet another example, processing log records corresponds to applying the log records to one or more replica databases. In yet another example, the method further includes allowing, by the one or more processors, the read transaction in response to the block being the first block being modified in the batch. In yet another example, the method further includes processing, by the one or more processors, commit records for the batch of log records after completing processing of other log records of the batch.

In yet another example, the method further includes: processing, by the one or more processors, a log record of the batch pertaining to a data definition language (DDL); committing, by the one or more processors, the log record pertaining to the DDL; and initiating, by the one or more processors, processing of a subsequent batch of log records after committing the log record pertaining to the DDL. In yet another example, the method further includes finding, by the one or more processors, disjoint subsets of log records in the batch using a union-find technique. In yet another example, the union-find technique includes creating subsets, wherein only one subset has all log records modifying a particular block. In yet another example, the method further includes assigning, by the one or more processors, each disjoint subset to a parallel process, wherein only one process applies a log record affecting multiple blocks after locking the multiple blocks.

Another aspect of the disclosure provides for a system including: one or more processors; and one or more storage devices coupled to the one or more processors and storing instructions that, when executed by the one or more processors, cause the one or more processors to perform operations for parallel write ahead log (WAL) record processing, the operations including: receiving a batch of log records, each log record having a log sequence number (LSN); assigning the log records of the batch to one or more parallel processes based on one or more block references, wherein each log record of the batch is processed in LSN order by the parallel process to which each log record of the batch is assigned; determining that a read transaction is reading a block of data being modified in the batch of log records; and instructing the read transaction to wait for the log records of the batch to be applied on the block of data being modified in response to the block not being the first block being modified in the batch.

In an example, assigning the log records of the batch to a parallel process further includes using a hash function that includes the one or more block references. In another example, the operations further include: determining a log record of the batch affects multiple blocks of data; locking the multiple blocks of data before the batch is applied; and generating a fake local buffer. In yet another example, the operations further include processing commit records for the batch of log records after completing processing of other log records of the batch.

In yet another example, the operations further include: processing a log record of the batch pertaining to a data definition language (DDL); committing the log record pertaining to the DDL; and initiating processing of a subsequent batch of log records after committing the log record pertaining to the DDL. In yet another example, the operations further include finding disjoint subsets of log records in the batch using a union-find technique. In yet another example, the operations further include assigning each disjoint subset to a parallel process, wherein only one process applies a log record affecting multiple blocks after locking the multiple blocks.

Yet another aspect of the disclosure provides for a non-transitory computer readable medium for storing instructions that, when executed by one or more processors, cause the one or more processors to perform operations for parallel write ahead log (WAL) record processing, the operations including: receiving a batch of log records, each log record having a log sequence number (LSN); assigning the log records of the batch to one or more parallel processes based on one or more block references, wherein each log record of the batch is processed in LSN order by the parallel process to which each log record of the batch is assigned; determining that a read transaction is reading a block of data being modified in the batch of log records; and instructing the read transaction to wait for the log records of the batch to be applied on the block of data being modified in response to the block not being the first block being modified in the batch.

DETAILED DESCRIPTION

The technology relates generally to a parallel recovery mode to apply log records while allowing read queries on read-replica databases. The parallel recovery mode can manage log records in log sequence number (LSN) order for a data block or for multiple data blocks, dependency between different log records, and log records pertaining to data definition language (DDL) to maintain transactional consistency for read queries.

Replica databases can together replay a batch of log records in parallel. When a current batch of log records is replayed, the replica databases move on to the next batch of log records. The batch size, e.g., the number of log records in the batch, can be configurable. The parallel recovery mode allows for the batch of log records to be visible to all queries at the same time atomically on the replica databases. A primary database can periodically send the log records as they are generated to the replica databases, and the replica databases can apply or skip the log records.

Figure 1:
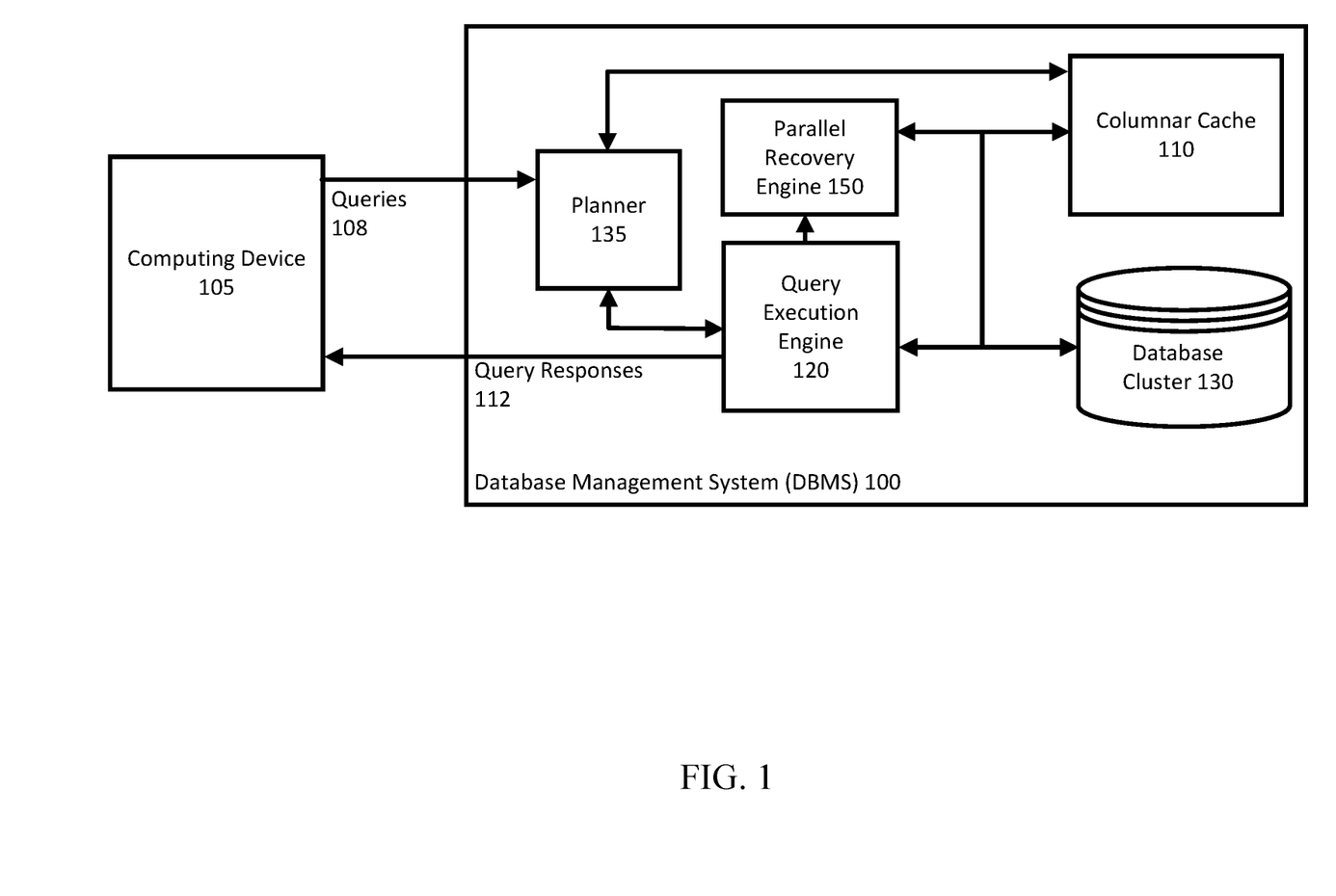
FIG. 1 depicts a block diagram of an example database management system (DBMS) configured to perform parallel recovery while still serving read queries consistently on a read-replica database according to aspects of the disclosure.

FIG. 1 depicts a block diagram of an example database management system (DBMS) 100 configured to perform parallel recovery while still serving read queries consistently on a read-replica database. The DBMS 100 can be implemented on one or more computing devices in one or more physical locations. For example, the DBMS 100 can be configured for managing data on a computing platform of computing devices, which may include any number of computing devices and/or storage devices. The DBMS 100 can include parallel recovery engine 150, a columnar cache 110, a query execution engine 120, a database cluster 130, and a planner 135.

The DBMS 100 can be configured to receive queries, such as queries 108 from computing device 105, and resolve queries by providing responses, such as query responses 112. A query response 112 can include one or more rows or columns of one or more tables of a database of the database cluster 130, or portions of the one or more rows or columns. Before providing the query response 112, the DBMS 100 can optionally process the data, for example by aggregating and/or sorting the rows of the response. Operations for processing the query response 112 can be part of a predetermined pipeline that the DBMS 100 is configured to execute as part of resolving a query 108.

The computing device 105 can be any of a variety of computing devices configured for querying a database. For example, the computing device 105 can be a personal laptop, a server, a wearable device, a sensor, etc. The computing device 105 can be user-operated and include peripherals or other components for receiving user input. In other examples, the computing device 105 can be configured to automatically communicate with the DBMS 100, for example as part of executing a computer program, script, or hardware/firmware operation by the computing device 105. The DBMS 100 and the computing device 105 can communicate over a network and/or any of a variety of different types of wired or wireless connections.

In some examples, the DBMS 100 can be a hybrid transactional and analytical processing system (HTAP). An HTAP system is a database management system configured to perform both online transaction processing (OLTP) and online analytical processing (OLAP). OLTP systems are configured to coordinate and execute transactions between communicating computing devices. Transactions are recorded and updated in a corresponding database managed by an OLTP system. OLAP systems are configured to receive and resolve queries to a database used as part of analysis of data stored in the database. OLAP and OLTP systems are separately optimized for their respective use cases, with OLAP systems generally optimized for read-only access of data, and OLTP systems optimized for read and write access of queried data.

To improve the performance of query resolution, the DBMS 100 can implement the columnar cache 110. Queries to OLAP systems and HTAP systems supporting OLAP may include requests for data referenced by columns of tables in the database, as opposed to references to individual rows, which is more common in OLTP. To speed up resolution of queries by column, the DBMS 100 can implement the columnar cache 110.

The columnar cache 110 is a cache that stores data by column, rather than by row, allowing for reducing the amount of data fetched from storage by only allowing access to the columns that are relevant for the query. The columnar cache 110 can be implemented asynchronously, so occasionally the columnar cache 110 can contain stale data, such as invalidated blocks. At least for some applications, such as HTAP systems, the DBMS 100 can answer queries 108 and at the same time accept updates to base tables from which data is cached. The DBMS 100 can implement a hybrid query execution to allow for the use of asynchronous columnar caches, enabling the execution of queries 108 that retrieve data from both the database cluster 130 and/or the columnar cache 110.

The database cluster 130 can be a primary database and one or more replica databases, each having a collection of tables or relations storing data along multiple dimensions. For example, a table of a database can store data along rows and columns of the table. The database cluster 130 can be implemented on storage devices, such as directed attached storage devices, including solid state drives, hard drives, flash drives, network attached storage devices, arrays of various combinations of different or the same storage devices, etc. Databases of the database cluster 130 can be column-store databases.

Read-replica databases of the database cluster 130 can operate in a continuous recovery mode, applying write ahead log (WAL) records received from the primary database of the database cluster 130. While the read-replica database catches up to the primary database, users can continue to run read queries. WAL record processing can be performed in parallel to avoid read-replica databases lagging behind the primary database, ensuring any database of the database cluster 130 can serve an accurate query response 112.

WAL is a technique to stabilize transaction processing by recording transactional changes as a log before applying the changes to storage. This technique ensures the consistency and durability of the database, facilitating data recovery in case of failures. Typically, when transactions occur in a database, the associated changes are recorded in a log. These changes are logged before being immediately applied to the actual data blocks in storage. Subsequently, instead of directly applying changes to data blocks, the recorded log is applied to maintain a consistent state.

Processing a log can refer applying or replaying previously recorded logs. Replaying operations are commonly used to either revert the database to a specific point or recover data by re-executing previously logged transactions in the event of various situations. Moreover, replay operations are utilized in database replication systems. For example, logs collected from the primary database are transmitted to backup or replicated databases, where these transmitted logs are replayed to synchronize changes. This process ensures that changes from the primary database are applied to the replicated database, maintaining identical data states.

Figure 2:
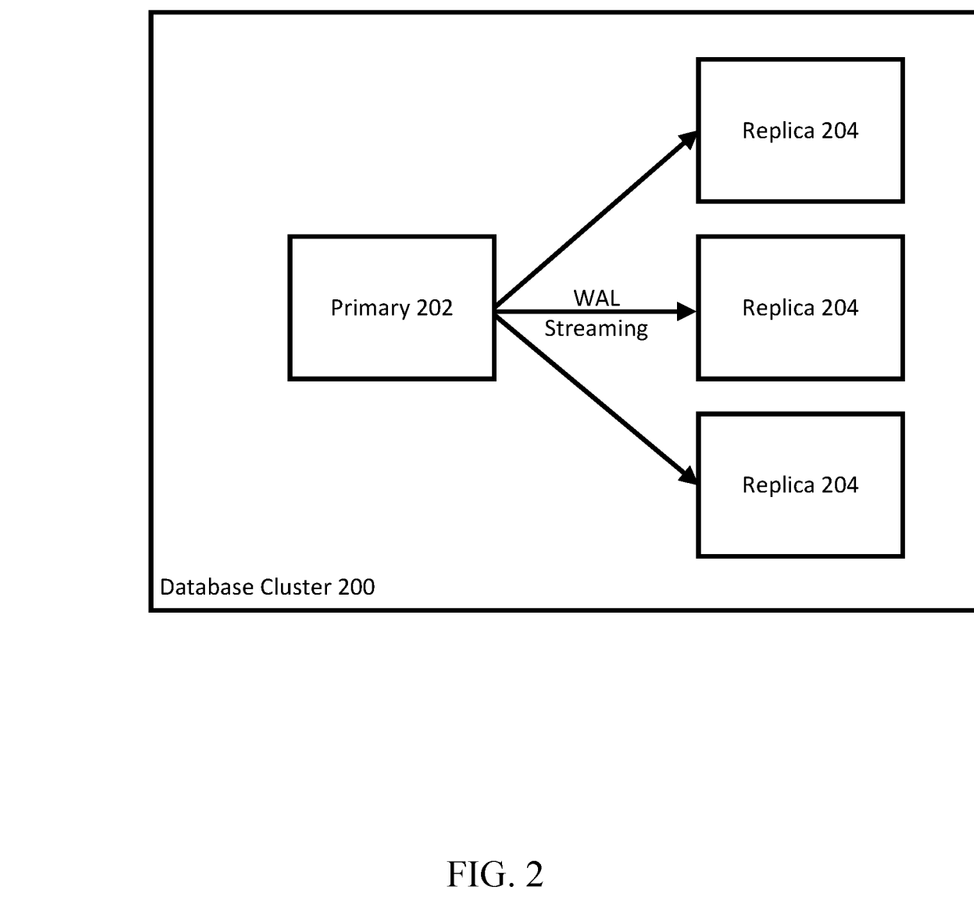
FIG. 2 depicts a block diagram of an example database cluster according to aspects of the disclosure.

FIG. 2 depicts a block diagram of an example database cluster 200. The database cluster 200 can correspond to the database cluster 130 of FIG. 1. The database cluster 200 can include a primary database 202 and one or more replica databases 204. The replica databases 204 can apply WAL records received from the primary database 202 to operate in a continuous recovery mode.

Referring back to FIG. 1, the query execution engine 120 can be configured to receive queries 108 and generate query responses 112. The queries 108 can be part of a workload executed by the computing device 105, or some other device not shown. A workload can refer to one or more computer programs or scripts that include operations for querying the DBMS 100 for data. A workload can be automatic and on-going, or executed during pre-programmed intervals of time. In other examples, a workload is executed on-demand by the computing device 105, for example in response to user input to the device 105.

A query 108 to the DBMS 100 can include data to be retrieved from the DBMS 100. The specified data can be stored in the columnar cache 110 or in the database cluster 130 at the time of query execution. The query execution engine 120 can be configured to retrieve the queried data specified in a given query 108 and return the data as part of a query response 112.

The DBMS 100 is configured to generate a query execution plan. The DBMS 100 can include a planner 135 or communicate with a planner external to the DBMS 100. The planner 135 can generate a query execution plan according to any of a variety of different processes. As part of generating the query execution plan, the planner 135 can parse a received query 108 and select corresponding query operations to execute according to the plan, based on a number of predetermined criteria. The predetermined criteria can be, for example, based on efficient use of compute or storage resources, number of operations to perform, total time to execute the query 108, user input specifying certain types of operations to perform, etc. The planner 135 can receive and parse a query 108 to generate a query execution plan.

A query operation can refer to an action performed by the query execution engine 120 during the execution or resolution of the received query 108. A query operation can include reading or writing data from and to memory, performing arithmetic or logic calculations, performing a respective process for sorting, hashing, joining, aggregating, and scanning data, etc. The query execution plan can be a directed graph of nodes representing different operations to be performed by the DBMS 100. An example directed graph can be an expression evaluation tree. The query execution plan can also be represented as an ordered list or array of operations, in the order in which the operations of the plan must be executed to correctly execute the received and parsed query 108.

Query responses 112 generated by the query execution engine 120 are returned to the computing device 105. In some examples, query responses 112 can be returned to another destination computing device (not shown) that can be specified as a destination by the computing device 105. The computing device 105 can proceed to process the query responses 112 as part of a downstream process, which can include subsequent queries to the DBMS 100.

The DBMS 100 can communicate data between the computing device 105 and/or another computing device (not shown), using an interface, such as a graphic user instance, displayed on a display of the computing device 105. The interface can include a number of user-interactable elements, such as buttons, toggles, sliders, checkboxes, etc., for modifying the behavior of the DBMS 100 and/or displaying certain types of information, described presently. In other examples, the interface can include an API exposing the DBMS 100 for modifying different parameters related to the functionality of the DBMS 100, such as cache configuration, according to calls to the API.

The parallel recovery engine 150 is configured to perform WAL record processing in parallel. The parallel recovery engine 150 can include a leader and one or more worker processes, e.g., parallel processes, for performing the WAL record processing. The leader and worker processes can apply, e.g., replay, a batch of log records in parallel, such as in the one or more replica databases 204 as depicted in FIG. 2. When a current batch of log records is replayed, the leader and worker processes continue to replay the next batch of log records. Any number of log records can be included in a batch, such as via user configuration. The batch of log records can be visible to all queries 108 at the same time atomically. The leader process can assign the log records to the worker processes, and the worker processes can apply the log records to one or more replica databases 204.

To serve read query responses 112 while performing parallel recovery, the parallel recovery engine 150 can be configured to apply log records in LSN order for a block of data or for multiple blocks of data. Each worker process of the parallel recovery engine 150 can apply the log records in their received order, e.g., LSN order. For applying log records in LSN order for a block, the worker processes can use a union-find technique to determine disjoint subsets of log records in the batch, where the disjoint subsets can have one subset containing all the log records for modifying a specific block. Each disjoint subset can be assigned to a worker.

To distribute log records in LSN order across the worker processes evenly, the leader process can use a hash function on the block references. Block references can include database number, tablespace number, table number, fork number, and/or block number, as examples. The hash function can correspond to any hash function that maps one or more of the block references to a random and/or unique number, such as division hash, knuth hash, multiplication hash, string hash, universal hash, or perfect hash. For example, the hash function can correspond to Hash(database number, tablespace number, table number, fork number, block number, etc.) % NUM_WORKERS. The Hash( . . . ) can correspond to the type of hash function for mapping the block references, the % can correspond to a modulo, and the NUM_WORKERS can correspond to the number of workers created by the leader process for performing parallel recovery.

As an example, consider a block-ID (block_number=1, table_number=2, tablespace_number=3, database_number=4) and assume the hash function is performing a sum. Then Hash (1, 2, 3, 4)=10. If the number of workers is 2, e.g., worker-0 and worker-1, then 10% 2=0. Therefore, block-ID (block_number=1, table_number=2, tablespace_number=3, database_number=4) can get assigned to worker-0.

The database number, tablespace number, table number, fork number, and/or block number can uniquely identify a block to which a log record is applied. The leader process can send log records to all designated workers per hash function. To apply a log record, the worker can supply all affected blocks to the callback that applies the log record. The worker processes can use a fake local buffer if a particular affected block is not assigned to that worker process per the hash function. These fake local buffers can be supplied to the callback that applies the log record. The fake local buffer would not affect concurrent queries or other replay workers that access the real block.

For managing log records that affect multiple blocks of data, the log records can be applied atomically to the affected block such that concurrent queries do not observe an intermediate state during applying of the log records. The leader process can acquire an exclusive lock on all the affected blocks of that multi-block record and then assign the log records to worker processes for applying the log records. The leader process can release the exclusive lock when the worker processes finish applying the log records of the batch.

As an example, consider a log record affecting blocks B1 and B2. If there is a concurrent read-query reading both B1 and B2, that read-query can either read B1 and B2 before applying the log record to both blocks or read B1 and B2 after applying the log record to both blocks. The leader process can lock the both blocks for applying the log records, ensuring that concurrent read-query does not observe the state of both blocks.

The parallel recovery engine 150 can be configured to manage dependency between different log records. The worker processes can process different log records affecting different blocks of data in parallel without affecting the accuracy of the data in the blocks. However, when read queries are issued while a batch replay is in progress, queries can run into physical consistency issues, such as with heap, index, and/or other block types that involve dependency between different log records. For example, the worker processes can process a log record for a heap block before a log record for an index block. If the replay of the log records in the index block is performed before the replay of the log records in the corresponding heap block, concurrent read queries could have unexpected content in the heap page. To manage dependency, if a read-transaction by a read query reads a modified block in the in-progress batch and requires access to the same or another affected block from the same batch, the read-transaction needs to wait until the relevant log records of the batch are applied to that block. The leader process can also acquire an exclusive lock on all affected blocks of the batch before processing, and then assign the log records to workers for applying the log records.

Figure 3:
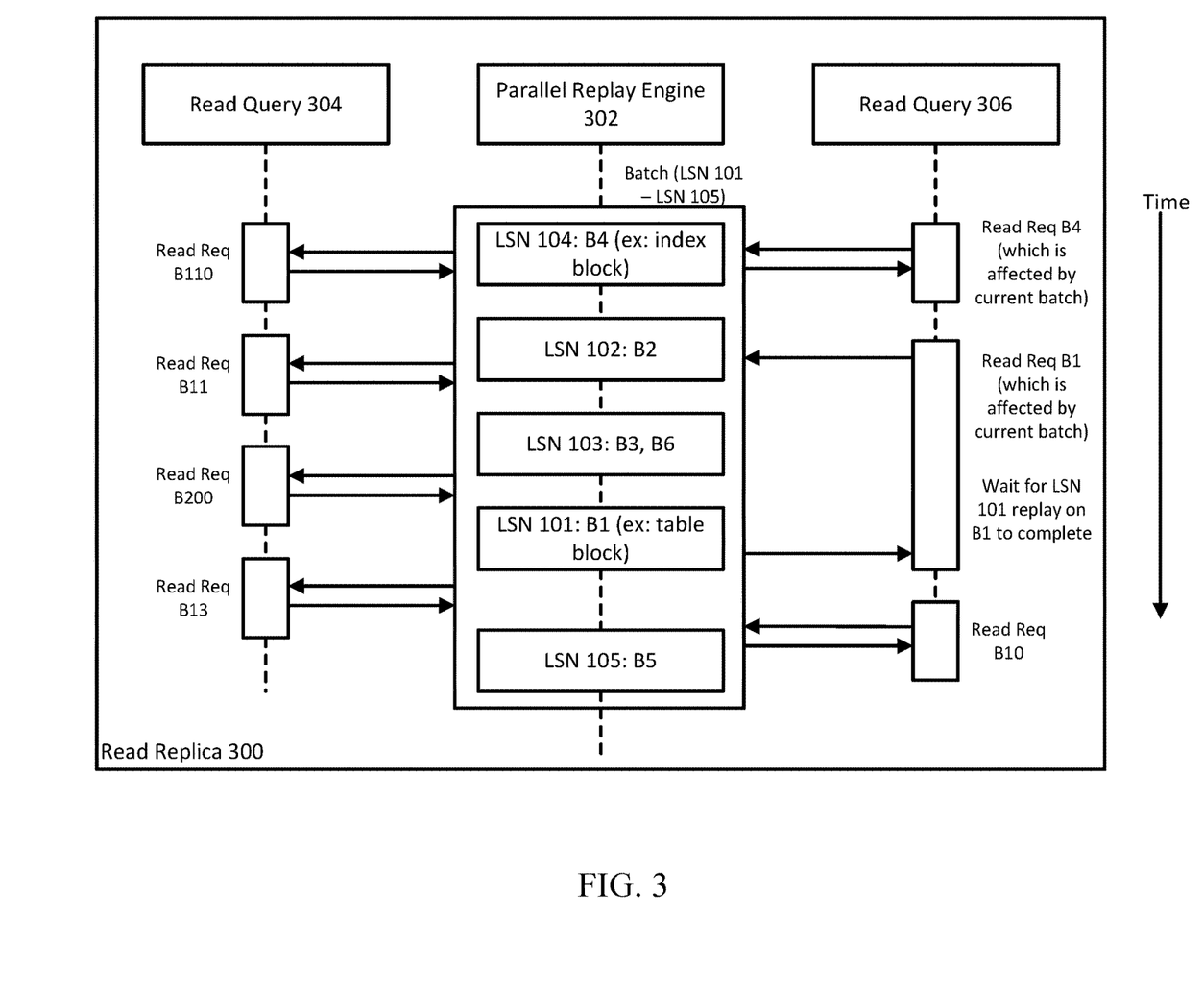
FIG. 3 depicts a swim lane diagram of an example parallel replay for a read replica database according to aspects of the disclosure.

FIG. 3 depicts a swim lane diagram of an example parallel replay engine 302 for a read replica database 300. The parallel replay engine 302 can correspond to the parallel recovery engine 150 of FIG. 1, having a leader process and one or more worker processes. The read replica database 300 can correspond to a database of the database cluster 130 of FIG. 1 and/or one of the replicas 204 of FIG. 2. Read query processes 304 and 306 can be part of the query execution engine 120 of FIG. 1.

The parallel replay engine 302 can process a batch of log records with LSNs, such as LSN 101-105. For example, LSN 101 can affect block B1 associated with a table, LSN 102 can affect block B2, LSN 103 can affect blocks B3 and B6, LSN 104 can affect block B4 associated with an index, and LSN 105 can affect block B5. Since the fourth block B4 is associated with an index and the first block is associated with a table, the parallel replay 302 can process the LSN 104 before LSN 101. It should be noted FIG. 3 shows only one possible order for applying the batch of log records, and the parallel replay engine 302 can apply the log records in any order as it assigns each log record to different workers.

The read query process 304 can process read requests for blocks B110, B11, B200, and B13 based on received queries. Since these blocks are not affected by the batch LSN 101-105 being processed during the same time span in which B110/B11/B200/B13 are being processed, the read query process 304 can process these read queries in the order they are received without any waiting period.

The read query process 306 can process read requests for block B4, block B1, and block B10. Since block B4 and block B1 are affected by the batch LSN 101-105 being processed during the same time span in which B4 and B1 are being read by read query process 306, the read query process 306 may need to wait until the relevant logs in the current batch are processed. The parallel replay engine 302 can process the LSN 104 first in the batch LSN 101-105. The read query process 306 does not need to wait to process the block B4 as it is the first read by the read query process 306 for the batch. However, the parallel replay engine 302 can process the LSN 101 fourth in the current batch, so the read query process 306 needs to wait a period of time for the replay of LSN 101 to complete before processing the block B1. The block B10 is not affected by the batch LSN 101-105, so the read query process 306 can process the block B10 without any waiting period.

Figure 4:
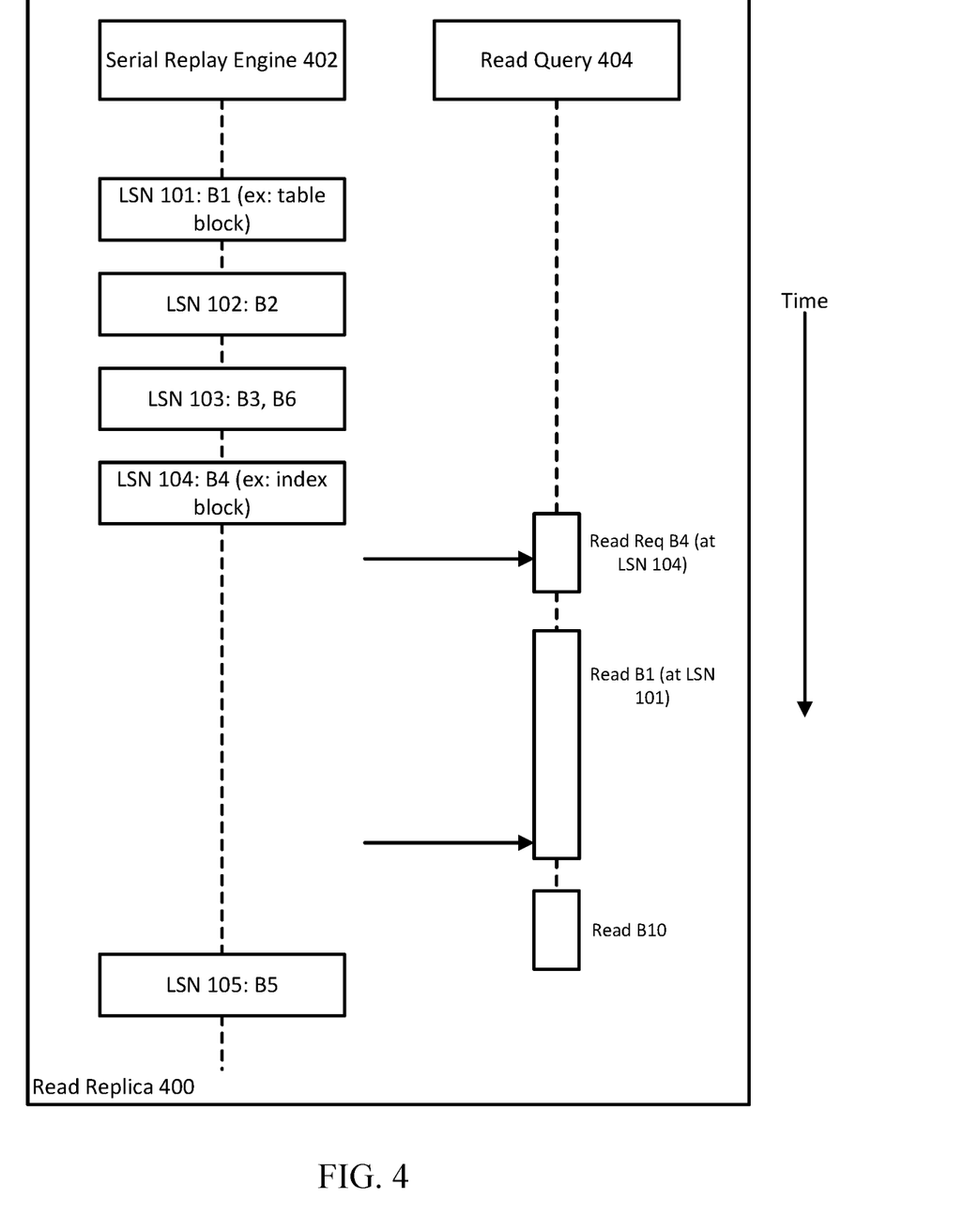
FIG. 4 depicts a swim lane diagram of an example serial replay for a read replica database according to aspects of the disclosure.

FIG. 4 depicts a swim lane diagram of an example serial replay engine 402 for a read replica database 400. The serial replay engine 402 can be part of the parallel recovery engine 150 of FIG. 1, having a leader process and one or more worker processes. The read replica database 400 can correspond to a database of the database cluster 130 of FIG. 1 and/or one of the replicas 204 of FIG. 2. Read query process 404 can be part of the query execution engine 120 of FIG. 1.

The serial replay engine 402 can process LSNs, such as LSN 101-105, in the order they are received. For example, LSN 101 can correspond to a block B1 associated with a table, LSN 102 can correspond to a block B2, LSN 103 can correspond to a block B3 and a block B6, LSN 104 can correspond to a block B4 associated with an index, and LSN 105 can correspond to a block B5.

The read query process 404 can process read requests for the block B4, block B1, and the block B10. The read query process 404 can first process the block B4, then block B1, and then B10. As depicted in FIG. 3, the parallel replay engine 302 is processing the blocks B4, B1, and B10 after their replay. Therefore, parallel replay engine 302 can maintain consistency similar to that of the serial replay engine 402.

The parallel recovery engine 150 maintains transactional consistency on read queries by making transactional changes atomically visible at the end of the batch. Existing transactions can already include a transaction snapshot, making them immune to changes in blocks containing commit status of transactions. For new transactions obtaining the transaction snapshot, the worker processes can see either all changes of a batch or none at all. As the batch is replayed, the status of one or more transactions may change. These transaction status changes can be made atomically visible at the end of a replay of a batch. The leader process of the parallel recovery engine 150 can process commit records at the end of a batch in LSN order, e.g., after applying all of the other log records of the batch.

For example, the parallel recovery engine 150 can maintain transactional consistency for a first transaction T1 and a second transaction T2. The two transactions T1 and T2 can be ongoing. An upcoming batch of log records can include the commit records for transactions T1 and T2. Further, there can be an ongoing read R1 started before the replay of the upcoming batch, a read R2 started during the replay of the upcoming batch, and a read R3 started after the replay of the upcoming batch and completed. To maintain transactional consistency, the parallel recovery engine 150 does not read the changes made by T1 and T2 for R1 as R1 forms its transaction snapshot before the upcoming batch is replayed. The parallel recovery engine 150 also does not read the changes made by T1 and T2 for R2 as its transaction snapshot before the upcoming batch replay is completed. The parallel recovery engine 150 does read the changes made by T1 and T2 for R3 as R3 forms its transaction snapshot after the batch was replayed where T1 and T2 were committed.

The leader process can create, extend, truncate, and/or drop storage and may not assign such log records to the worker processes. These log records can act as barriers, e.g., when an existing batch is replayed, the leader can apply the log record which can create, extend, truncate, or drop the storage. Then, a new batch can be initiated. This can also apply to log records without a block-ID number.

The parallel recovery engine 150 can be also configured to manage log records pertaining to data definition language (DDL). The DDL can correspond to a syntax for creating and modifying data objects, such as tables, indices, and users. DDL can include a collection of verbs to modify the data objects by adding, changing, or deleting definitions of tables or other elements. Log records pertaining to a DDL can be performed in the same batch, but for example, create table DDLs can be applied only before other log records which insert, delete, and/or update rows into that table, and drop table DDLs can be applied only after other log records which insert, delete, and/or update rows into that table. Similar management can be applied for other DDLs which create or drop databases, tablespaces, etc. Therefore, the parallel recovery engine 150 can complete an existing batch before initiating the first log record of a batch having a DDL transaction. Then, the parallel recovery engine 150 cannot complete the batch having the DDL transaction until committing the DDL transaction. Table DDLs in general can have an exclusive lock on the table. When a read-replica encounters a log record which takes an exclusive lock on the table, such log records can be treated as barriers, which the leader process can apply such log records in isolation.

Figure 5:
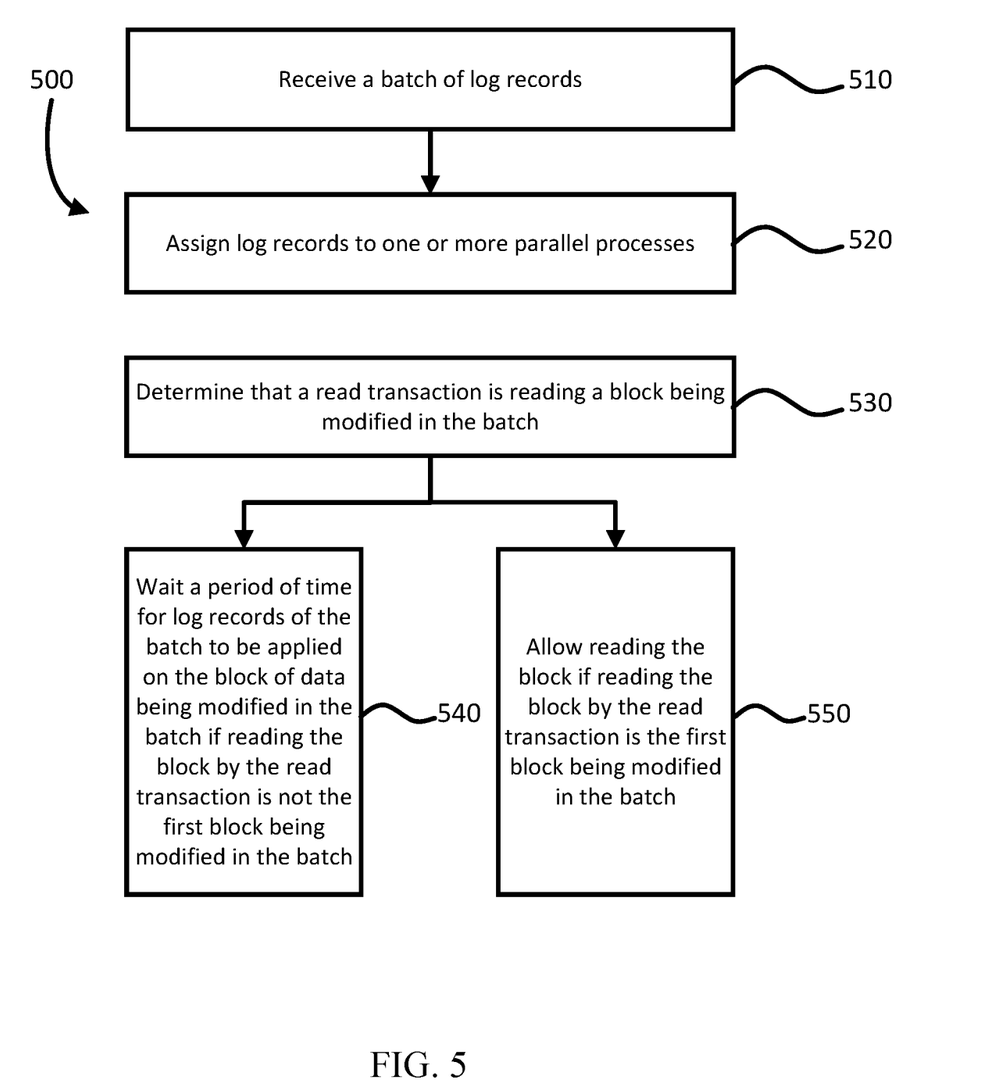
FIG. 5 depicts a flow diagram of an example process for parallel recovery while maintaining transactional consistency according to aspects of the disclosure.

FIG. 5 depicts a flow diagram of an example process 500 for parallel recovery while maintaining transactional consistency. The example process 500 can be performed on a system of one or more processors in one or more locations, such as the example DBMS 100 of FIG. 1.

As shown in block 510, the parallel recovery engine 150 can receive a batch of log records. The log records can include a LSN to indicate the order in which each log record was received.

As shown in block 520, the leader process of the parallel recovery engine 150 can assign log records to one or more parallel processes based on one or more block references. The block references can include database number, tablespace number, table number, fork number, and/or block number, as examples. The leader process of the parallel recovery engine 150 can use one or more hash functions that include the one or more block references to assign log records to the one or more parallel processes. The log records can be processed in LSN order by the parallel process to which the log records are assigned. Processing log records can correspond to applying the log records to one or more replica databases or skipping applying the log record.

As shown in block 530, the parallel recovery engine 150 can determine that a read transaction is reading a block being modified in the batch of log records. That is, the parallel recovery engine 150 can identify which blocks the batch of log is applying to and if the concurrent read query reads the block where the batch of log is being applied.

As shown in block 540, the parallel recovery engine 150 can wait a period of time for the log records in the batch to be applied on the block of data being modified in the batch if reading the block by a read query is not the first block being modified in the batch. Otherwise, as shown in block 550, the parallel recovery engine 150 can allow reading the block if reading the block is the first block being modified in the batch.

Figure 6:
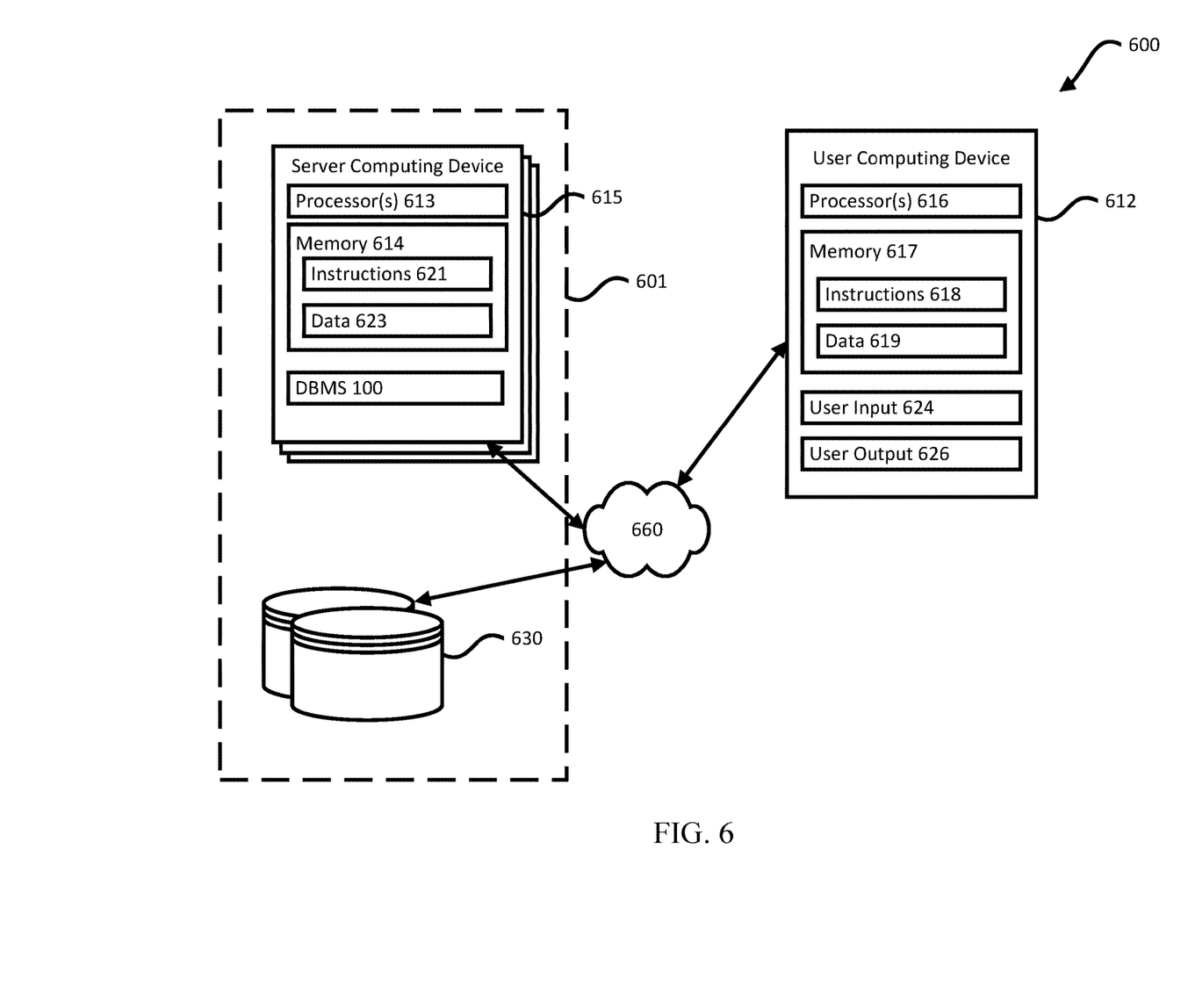
FIG. 6 depicts a block diagram of an example computing environment implementing a DBMS can that perform parallel recovery while still serving read queries consistently on a read-replica database according to aspects of the disclosure.

FIG. 6 depicts a block diagram of an example computing environment 600 implementing the DBMS 100 that can perform parallel recovery while still serving read queries consistently on a read-replica database. The DBMS 100 can be implemented on one or more devices having one or more processors in one or more locations, such as in server computing device 615. User computing device 612 and the server computing device 615 can be communicatively coupled to one or more storage devices 630 over a network 660. The server computing device 615 and storage devices 630 can form part of a computing platform 601. The computing platform 601 can be a cloud computing platform, offering a variety of different services, for example for providing compute and storage resources to users of the platform.

The storage devices 630 can be a combination of volatile and non-volatile memory and can be at the same or different physical locations than the computing devices 612, 615. For example, the storage devices 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. The memory 614 can store information accessible by the processors 613, including instructions 621 that can be executed by the processors 613. The memory 614 can also include data 623 that can be retrieved, manipulated, or stored by the processors 613. The memory 614 can be a type of non-transitory computer readable medium capable of storing information accessible by the processors 613, such as volatile and non-volatile memory. The processors 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processors 613, cause the one or more processors to perform actions defined by the instructions 621. The instructions 621 can be stored in object code format for direct processing by the processors 613, or in other formats including interpretable scripts or collections of independent source code modules that are interpreted on demand or compiled in advance. The instructions 621 can include instructions for implementing the DBMS 100 consistent with aspects of this disclosure. The DBMS 100 can be executed using the processors 613, and/or using other processors remotely located from the server computing device 615.

The data 623 can be retrieved, stored, or modified by the processors 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similarly to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the platform user of the user computing device 612.

Although FIG. 6 illustrates the processors 613, 616 and the memories 614, 616 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 615, 612.

The server computing device 615 can be configured to receive requests to process data from the user computing device 612. For example, the environment 600 can be part of a computing platform configured to provide a variety of services to users, through various user interfaces and/or APIs exposing the platform services.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz, commonly associated with the Bluetooth® standard, 2.4 GHz and 5 GHz, commonly associated with the Wi-Fi® communication protocol; or with a variety of communication standards, such as the LTE® standard for wireless broadband communication. The network 660, in addition or alternatively, can also support wired connections between the devices 612, 615, including over various types of Ethernet connection.

Although a single server computing device 615 and user computing device 612 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for performing parallel write ahead log (WAL) record processing, the method comprising:
   receiving, by one or more processors, a batch of log records, each log record having a log sequence number (LSN);
   identifying, by the one or more processors, disjoint subsets of log records in the batch;
   assigning, by the one or more processors, the disjoint subsets of log records to respective parallel processes based on one or more block references, wherein each log record of the batch is processed in LSN order by the parallel process to which that log record is assigned;
   determining, by the one or more processors, that a log record of the batch affects multiple blocks of data;
   locking, by the one or more processors, the multiple blocks of data for applying the log record affecting the multiple blocks of data;
   determining, by the one or more processors, that a read transaction is reading a block of data being modified in the batch of log records; and
   instructing, by the one or more processors, the read transaction to wait for the log records of the batch to be applied on the block of data being modified in response to the block of data not being the first block of data being modified in the batch.

2. The method of claim 1, wherein the LSNs correspond to an order that the log records were received.

3. The method of claim 1, wherein the one or more block references comprises at least one of database number, tablespace number, table number, fork number, or block number.

4. The method of claim 1, wherein assigning the disjoint subsets of log records to the respective parallel processes further comprises using a hash function that includes the one or more block references.

5. The method of claim 1, wherein the disjoint subsets of log records are identified using a union-find technique.

6. The method of claim 5, wherein the union-find technique comprises generating the disjoint subsets, wherein each disjoint subset has log records for modifying a particular block of data.

7. The method of claim 1, wherein the multiple blocks of data are locked before the log record is applied.

8. The method of claim 1, further comprising generating, by the one or more processors, a fake local buffer.

9. The method of claim 1, wherein processing log records corresponds to applying the log records to one or more replica databases.

10. The method of claim 1, further comprising allowing, by the one or more processors, the read transaction in response to the block being the first block being modified in the batch.

11. The method of claim 1, further comprising processing, by the one or more processors, commit records for the batch of log records after completing processing of other log records of the batch.

12. The method of claim 1, further comprising:
   processing, by the one or more processors, a log record of the batch pertaining to a data definition language (DDL);
   committing, by the one or more processors, the log record pertaining to the DDL; and
   initiating, by the one or more processors, processing of a subsequent batch of log records after committing the log record pertaining to the DDL.

13. A system comprising:
   one or more processors; and
   one or more storage devices coupled to the one or more processors and storing instructions that, when executed by the one or more processors, cause the one or more processors to perform operations for parallel write ahead log (WAL) record processing, the operations comprising:
      receiving a batch of log records, each log record having a log sequence number (LSN);
      identifying disjoint subsets of log records in the batch;

assigning the disjoint subsets of log records to respective parallel processes based on one or more block references, wherein each log record of the batch is processed in LSN order by the parallel process to which that log record is assigned;

determining that a log record of the batch affects multiple blocks of data;

locking the multiple blocks of data for applying the log record affecting the multiple blocks of data;

determining that a read transaction is reading a block of data being modified in the batch of log records; and instructing the read transaction to wait for the log records of the batch to be applied on the block of data being modified in response to the block of data not being the first block of data being modified in the batch.

14. The system of claim 13, wherein assigning the disjoint subsets of log records to the respective parallel processes further comprises using a hash function that includes the one or more block references.

15. The system of claim 13, wherein the operations further comprise generating a fake local buffer.

16. The system of claim 13, wherein the operations further comprise processing commit records for the batch of log records after completing processing of other log records of the batch.

17. The system of claim 13, wherein the operations further comprise:

processing a log record of the batch pertaining to a data definition language (DDL);

committing the log record pertaining to the DDL; and initiating processing of a subsequent batch of log records after committing the log record pertaining to the DDL.

18. The system of claim 13, wherein the disjoint subsets of log records are identified using a union-find technique.

19. The system of claim 13, wherein the multiple blocks of data are locked before the log record is applied.

20. A non-transitory computer readable medium for storing instructions that, when executed by one or more processors, cause the one or more processors to perform operations for parallel write ahead log (WAL) record processing, the operations comprising:

receiving a batch of log records, each log record having a log sequence number (LSN);

identifying disjoint subsets of log records in the batch;

assigning the disjoint subsets of log records to respective parallel processes based on one or more block references, wherein each log record of the batch is processed in LSN order by the parallel process to which that log record is assigned;

determining that a log record of the batch affects multiple blocks of data;

locking the multiple blocks of data for applying the log record affecting the multiple blocks of data;

determining that a read transaction is reading a block of data being modified in the batch of log records; and instructing the read transaction to wait for the log records of the batch to be applied on the block of data being modified in response to the block of data not being the first block of data being modified in the batch.

* * * * *